United States Patent
Jyono et al.

(12) 
(10) Patent No.: US 6,541,593 B1
(45) Date of Patent: Apr. 1, 2003

(54) PROCESS FOR THE PREPARATION OF POLYETHER OLIGOMER CONTAINING REACTIVE SILICON GROUP

(75) Inventors: Hideharu Jyono, Kobe (JP); Hidetoshi Odaka, Takasago (JP); Hiroshi Ando, Akashi (JP); Hiroshi Iwakiri, Kobe (JP); Hiroshi Ito, Takasago (JP); Fumio Kawakubo, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/530,921

(22) PCT Filed: Oct. 1, 1998

(86) PCT No.: PCT/JP98/04441

§ 371 (c)(1),
(2), (4) Date: Jun. 14, 2000

(87) PCT Pub. No.: WO99/24489

PCT Pub. Date: May 20, 1999

(30) Foreign Application Priority Data

Nov. 12, 1997 (JP) .............................................. 9-310138

(51) Int. Cl.⁷ ............................ C07F 7/02; C08G 77/60; C08G 77/00
(52) U.S. Cl. ............................ 528/15; 528/25; 528/31; 528/409; 528/410; 528/414; 556/479
(58) Field of Search ............................ 556/479; 528/15, 528/25, 31, 409, 410, 414

(56) References Cited

U.S. PATENT DOCUMENTS

| | | | |
|---|---|---|---|
| 4,242,466 A | * | 12/1980 | Schilling, Jr. et al. |
| 4,965,311 A | * | 10/1990 | Hirose et al. |
| 5,223,583 A | * | 6/1993 | Higuchi et al. |
| 6,248,915 B1 | * | 6/2001 | Ito et al. |

FOREIGN PATENT DOCUMENTS

| | | |
|---|---|---|
| EP | 0 693 513 A2 | 1/1996 |
| JP | 7-179744 | 7/1995 |
| JP | 9-296046 | * 11/1997 |

OTHER PUBLICATIONS

"Contemporary Polymer Chemistry, 2nd edition", Allcock et al., Prentice Hall Inc., 1990, p. 2.*

* cited by examiner

*Primary Examiner*—Robert Dawson
*Assistant Examiner*—Marc S. Zimmer
(74) *Attorney, Agent, or Firm*—Connolly Bove Lodge & Hutz LLP

(57) ABSTRACT

A process for producing a reactive silicon group-containing polyether oligomer, which comprises reacting (a) a polyether oligomer the backbone chain of which comprises a polyether and which contains in a side chain or at a terminus of its molecule at least one unsaturated group of the following general formula (1):

$$H_2C=C(R^1)-R^2-O- \quad (1)$$

(wherein $R^1$ represents a hydrocarbon group of not more than 10 carbon atoms; $R^2$ represents a divalent organic group of 1 to 20 carbon atoms which contains in a side chain or at a terminus of its molecule at least one atomic species selected from the group consisting of hydrogen, oxygen and nitrogen as its constituent atom or atoms) or the general formula (2):

$$HC(R^1)=CH-R^2-O- \quad (2)$$

(wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms), with (b) a reactive silicon group-containing compound, (c) in the presence of a Group VIII transition metal catalyst to thereby introduce the reactive silicon group into said oligomer (a).

11 Claims, No Drawings

PROCESS FOR THE PREPARATION OF POLYETHER OLIGOMER CONTAINING REACTIVE SILICON GROUP

FIELD OF THE INVENTION

The present invention relates to a novel reactive silicon group-containing polyether oligomer for use mainly in a moisture-curable resin and to a process for the production thereof. More particularly, the present invention relates to a reactive silicon group-containing polyether oligomer which is produced by hydrosilylating an unsaturated group-containing polyether oligomer with a reactive silicon group-containing compound and to a process for the production thereof.

BACKGROUND OF THE INVENTION

The technology for producing a reactive silicon group-containing polyether oligomer comprising reacting an unsaturated group-containing polyether oligomer with a reactive silicon group-containing compound in the presence of a Group VIII transition metal catalyst, such as chloroplatinic acid, has been disclosed (Japanese Kokoku Publication Sho-45-36319, Japanese Kokoku Publication Sho-46-12154, Japanese Kokoku Publication Sho-8-36960, Japanese Kokoku Publication Sho-58-41291, Japanese Kokoku Publication Sho-63-37820). However, in the hydrosilylation reaction of the unsaturated group with said reactive silicon group-containing compound, the reaction yield of the reactive silicon group based on the unsaturated group is self-limited when the starting polyether oligomer contains allyl group as said unsaturated group, for the intramolecular rearrangement of allyl group to propenyl group occurs as a side reaction. Therefore, when the reactive silicon group-containing polyether oligomer so produced is used in a curable resin composition which is a principal application thereof, the cured product is deficient in hardness so that its application requiring strength is restricted. The use of a polyether oligomer having an unsaturated group substituted by a monovalent organic group of 1 to 20 carbon atoms has also been disclosed but there is no disclosure about its specific structure, the production process utilizing the particular oligomer or the characteristics of the reactive silicon group-containing polyether oligomer which can be obtained.

The object of the present invention is to inhibit the intramolecular rearrangement of an unsaturated group during hydrosilylation and thereby produce a polyether oligomer with the reactive silicon group introduced at a high rate.

Having explored with diligence for enhancing the reaction yield of a reactive silicon group based on an unsaturated group, the present inventors found surprisingly that when a polyether oligomer having an unsaturated group of a specific structure, which can be easily produced, was used as a starting material, the above-mentioned side reaction of an unsaturated group during hydrosilylation could be inhibited so that the rate of introduction of a reactive silicon group based on the unsaturated group was dramatically increased; thus, a polyether oligomer could be produced with an average reactive silicon group introduction rate of not less than 85%. The present inventors found further that, in the production of said oligomer, a platinum catalyst having a specific ligand is remarkably effective in catalyzing the reaction. It was also discovered that the cured product of a polyether oligomer with a reactive silicon group introduced into the molecular terminus at a rate of not less than 85% on the average, which could be provided for the first time by the process of the present invention, exhibited exceptionally satisfactory physical characteristics as compared with the cured product of the conventional polyether oligomer with a reactive silicon group introduced into the molecular terminus only at a rate of about 80% on the average.

SUMMARY OF THE INVENTION

The present invention, therefore, relates to a process for producing a reactive silicon group-containing polyether oligomer, which comprises reacting (a) a polyether oligomer the backbone chain of which comprises a polyether and which contains in a side chain or at a terminus of its molecule at least one unsaturated group of the following general formula (1):

$$H_2C=C(R^1)-R^2-O- \qquad (1)$$

(wherein $R^1$ represents a hydrocarbon group of not more than 10 carbon atoms; $R^2$ represents a divalent organic group of 1 to 20 carbon atoms which contains in a side chain or at a terminus of its molecule at least one atomic species selected from the group consisting of hydrogen, oxygen and nitrogen as its constituent atom or atoms) or the general formula (2):

$$HC(R^1)=CH-R^2-O- \qquad (2)$$

(wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms). with (b) a reactive silicon group-containing compound, (c) in the presence of a Group VIII transition metal catalyst to thereby introduce the reactive silicon group into said oligomer (a).

The present invention, in a further aspect, relates to a reactive silicon group-containing polyether oligomer characterized in that a reactive silicon group of the following general formula (6):

$$-OR^2C(R^1)HCH_2(Si(R^3_{2-b})(X_b)O)_mSi(R^4_{3-a})X_a \qquad (6)$$

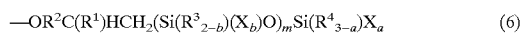

(wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms; $R^3$ and $R^4$ are the same or different and each represents an alkyl group of 1 to 20 carbon atoms, an aryl group of 6 to 20 carbon atoms, an aralkyl group of 7 to 20 carbon atoms, or a triorganosiloxy group of the formula $(R')_3SiO-$; when two or more $R^3$ or $R^4$ groups are present, they are the same or different; R' represents a monovalent hydrocarbon group of 1 to 20 carbon atoms and the three R' groups are the same or different; X represents a hydroxyl group or a hydrolyzable group and when two or more X groups are present, they are the same or different; a represents 0, 1, 2 or 3; b represents 0, 1, or 2; and m represents an integer of 0 to 19; b in m repeats of the $-Si(R^3_{2-b})(X_b)-O-$ group are the same or different over the repeats, provided that the condition of $a+\Sigma b \geq 1$ is satisfied) or general formula (7):

$$-OR^2CH_2CH(R^1)(Si(R^3_{2-b})(X_b)O)_mSi(R^4_{3-a})Xa \qquad (7)$$

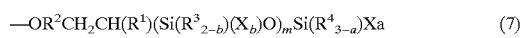

(wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms; $R^3$ and $R^4$ are the same or different and each represents an alkyl group of 1 to 20 carbon atoms, an aryl group of 6 to 20 carbon atoms, an aralkyl group of 7 to 20 carbon atoms, or a triorganosiloxy group of the formula $(R')_3SiO$— and when two or more $R^3$ or $R^4$ groups are present, they are the same or different; $R'$ represents a monovalent hydrocarbon group of 1 to 20 carbon atoms and the three $R'$ groups are the same or different; X represents a hydroxyl group or a hydrolyzable group and when two or more X groups are present, they are the same or different; a represents 0, 1, 2 or 3; b represents 0, 1 or 2; m represents an integer of 0 to 19; b in m repeats of the $-Si(R^3{}_{2-b})(X_b)-O-$ group are the same or different over the repeats; provided the condition of $a+\Sigma b \geq 1$ is satisfied) is introduced into the terminus of its molecular chain at a rate of not less than 85% on the average by the above process.

DETAILED DESCRIPTION OF THE INVENTION

The present invention is now described in detail. The polyether oligomer having an unsaturated group for use as the component (a) of the present invention may be any polyether oligomer having a polyether backbone chain and containing in a side chain or at a terminus of the molecule at least one unsaturated group of the general formula (1):

(wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms) or the general formula (2):

(wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms). $R^1$ includes but is not limited to straight-chain alkyl groups such as methyl, ethyl, propyl, butyl, pentyl, hexyl, heptyl, octyl, nonyl and decyl; branched-chain alkyl groups such as isopropyl, isobutyl isopentyl and isohexyl; and aryl groups such as phenyl. $R^1$ may represent one kind of group or a mixture of different kinds of groups. From reactivity point of view, $CH_3-$ and $CH_3-CH_2-$ are preferred and $CH_3-$ is particularly preferred. $R^2$ represents a divalent organic $C_{1-20}$ group containing as its constituent atom or atoms at least one atomic species selected from the group consisting of hydrogen, oxygen and nitrogen, including $-CH_2-$, $-C_2H_4-$, $-C_3H_6-$, $-C_4H_8-$, $-C_5H_{10}-$, $-C_6H_4-$, $-C_6H_{12}-$, $-C_7H_{14}-$, $-C_8H_{16}-$, $-C_9H_{18}-$, $-C_{10}H_{20}-$, $-CH(CH_3)-$, $-CH_2-CH(CH_3)-$, $-CH_2-CH(CH_3)-CH_2-$, $-C_2H_4-CH(CH_3)-$, $-CH_2-C_6H_4-$, $-CH_2-C_6H_4-CH_2-$ and $-C_2H_4-C_6H_4-$, among others. In view of the ease of synthesis, $-CH_2-$, $-CH_2CH_2-$ and $-CH_2CH(CH_3)-$ are preferred. Further preferred is $-CH_2-$ since the starting material is readily available. In addition, as the specific structures of the unsaturated groups, there can be mentioned, for example, $H_2C=C(CH_3)-CH_2-O-$, $H_2C=C(CH_2CH_3)-CH_2-O-$, $H_2C=C(CH_2CH(CH_3))-CH_2-O-$, $HC(CH_3)=CH-CH_2-O-$. Among these, $H_2C=C(CH_3)-CH_2-O-$ and $HC(CH_3)=CH-CH_2-O-$ are preferred from the standpoint of reactivity. In view of the availability of the starting material and the ease of synthesis, $H_2C=C(CH_3)-CH_2-O-$ is particularly preferred.

The molecular weight of the polyether oligomer as component (a) is not particularly restricted but, in terms of GPC polystyrene equivalent, the preferred number average molecular weight is 1,000 to 100,000. If the number average molecular weight is less than 1,000, cured products available from the reactive silicon group-containing polyether oligomer will be too brittle. On the other hand, if the limit of 100,000 is exceeded, the functional group concentration will become excessively decreased to retard the cure, in addition, the polymer viscosity will become unfavorably too high for efficient handling. The particularly preferred number average molecular weight is 1,000 to 50,000, in consideration of the viscosity of the product reactive silicon group-containing polyether oligomer.

The backbone chain of said polyether oligomer as component (a) may be any polymer chain comprised of the repeating unit of $-R-O-$, where R is a divalent $C_{1-20}$ organic group containing hydrogen and/or oxygen as constituent atom or atoms. It may be a homopolymer consisting of one and the same repeating unit or a copolymer consisting of two or more different repeating units. Furthermore, the backbone chain may be branched. For the production of the component (a) of the present invention, hydroxyl group-containing polyethers which can be prepared by the various methods, for example, described below can be employed.

In the production of the component (a) of the invention, there can be used the polyether obtained by the ring-opening addition polymerization of a substituted or unsubstituted $C_{2-12}$ epoxy compound such as an alkylene oxide, e.g. ethylene oxide, propylene oxide, α-butylene oxide, β-butylene oxide, hexene oxide, cyclohexene oxide, styrene oxide and α-methylstyrene oxide or an alkyl, allyl or aryl glycidyl ether, e.g. methyl glycidyl ether, ethyl glycidyl ether, isopropyl glycidyl ether, butyl glycidyl ether, allyl glycidyl ether and phenyl glycidyl ether, using as polymerization initiator a dihydric or polyhydric alcohol, e.g. ethylene glycol, propylene glycol, butanediol, hexamethylene glycol, methallyl alcohol, hydrogenated bisphenol A, neopentyl glycol, polybutadienediol, diethylene glycol, triethylene glycol, polyethylene glycol, polypropylene glycol, polypropylene triol, polypropylenetetraol, dipropylene glycol, glycerol, trimethylolmethane, trimethylolpropane and pentaerythritol, or a hydroxyl-containing oligomer in the presence of a suitable catalyst. The catalyst which can be used in this polymerization reaction includes known catalysts inclusive of alkaline catalysts such as KOH and NaOH, acid catalysts such as trifluoroborane etherate, aluminoporphyrin metal complexes and double metal cyanide complex catalysts such as zinc cyanocobaltate-glyme complex catalyst. Particularly preferred is a double metal cyanide complex catalyst which is low in the incidence of side reaction, although other catalysts may likewise be utilized.

The backbone chain of the unsaturated group-containing polyether oligomer (a) is preferably comprised predominantly of polypropylene oxide.

Production of component (a) through introduction of an unsaturated group into a hydroxy-terminated polyether oligomer can be achieved by any known method, for example by the method comprising reacting the hydroxy-terminated polyether oligomer with an unsaturated group-containing compound for bonding thereof by way of, for example, ether bonding, ester bonding, urethane bonding or carbonate bonding. Taking the introduction of an unsaturated group by ether bonding as an example, there can be mentioned the process which comprises converting the terminal hydroxyl group of the polyether oligomer to a metaloxy group, i.e. —OM (M=Na or K), and then reacting this oligomer with an organohalogen compound of the following general formula (8):

$$H_2C=C(R^1)-R^2-X \quad (8)$$

(wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms; X represents a halogen atom) or the general formula (9):

$$HC(R^1)=CH-R^2-X \quad (9)$$

(wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms; X represents a halogen atom) to provide a polyether having an unsaturated group at its terminus.

The reactive silicon group in the context of this invention is not particularly restricted but includes groups of the general formula (10) as representative examples.

$$-(Si(R^3{}_{2-b})(X_b)O)_m Si(R^4{}_{3-a})X_a \quad (10)$$

(wherein $R^3$ and $R^4$ are the same or different and each represents an alkyl group of 1 to 20 carbon atoms, an aryl group of 6 to 20 carbon atoms, an aralkyl group of 7 to 20 carbon atoms, or a triorganosiloxy group of the formula $(R')_3SiO-$; when two or more $R^3$ or $R^4$ groups are present, they may be the same or different; R' represents a monovalent hydrocarbon group of 1 to 20 carbon atoms and the three R' groups may be the same or different; X represents a hydroxyl group or a hydrolyzable group and when two or more X groups are present, they may be the same or different; a represents 0, 1, 2 or 3; b represents 0, 1 or 2; b in m repeats of the $-Si(R^3{}_{2-b})(X_b)-O-$ group may be the same or different; m represents an integer of 0 to 19; provided that the condition of $a+\Sigma b \geq 1$ is satisfied).

Referring to X above, the hydrolyzable group is not particularly restricted but can be any of the known hydrolyzable groups. Specifically, a hydrogen atom, a halogen atom, and alkoxy, acyloxy, ketoximate, amino, amido, acid amido, aminooxy, mercapto, alkenyloxy and other groups can be mentioned. Among these, alkoxy groups such as methoxy, ethoxy, propoxy and isopropoxy are preferred in view of their mild hydrolyzability and ease of handling.

The hydroxyl and/or hydrolyzable group may be bound, in a variable number of 1 to 3, to one silicon atom, and (a+Σb) is preferably 1 to 5. When two or more hydroxyl and/or hydrolyzable groups are present in the reactive silicon group, they may be the same or different.

The number of silicon atoms in the reactive silicon group may be either 1 or two or more, and may be about 20 in the reactive silicon group wherein silicon atoms are bound by siloxane bonding and so forth.

The preferred reactive silicon group include groups of the following general formula (11), which are readily available.

$$-Si(R^4{}_{3-a})X_a \quad (11)$$

(wherein $R^4$, X and a are as defined hereinbefore)

Referring to the general formula (10) given hereinbefore, $R^3$ and $R^4$ may each be, for example, an alkyl group such as methyl, ethyl, or the like; a cycloalkyl group such as cyclohexyl; an aryl group such as phenyl; an aralkyl group such as benzyl, or a triorganosiloxy groups of the formula $(R')_3SiO-$ where R' is methyl or phenyl, for instance. The particularly preferred example of $R^3$, $R^4$ or R' is methyl.

The reactive silicon group-containing compound as component (b) of this invention may be any compound that contains at least one silicon atom bound to said hydroxyl and/or hydrolyzable groups and at least one Si—H group within the molecule. Typical examples are compounds of the following general formula (3).

$$H-(Si(R^3{}_{2-b})(X_b)O)_m Si(R^4{}_{3-a})X_a \quad (3)$$

(wherein $R^3$, $R^4$, X, a, b and m have the same meanings as defined in the general formula (10)).

Thus, there can be mentioned halogenated silanes such as trichlorosilane, methyldichlorosilane, dimethylchlorosilane, phenyldichlorosilane, trimethylsiloxymethylchlorosilane, 1,1,3,3-tetramethyl-1-bromodisiloxane, etc.; alkoxysilanes such as trimethoxysilane, triethoxysilane, methyldiethoxysilane, methyldimethoxysilane, phenyldimethoxysilane, trimethylsiloxymethylmethoxysilane, trimethylsiloxydiethoxysilane, etc.; acyloxysilanes such as methyldiacetoxysilane, phenyldiacetoxysilane, triacetoxysilane, trimethylsiloxymethylacetoxysilane, trimethylsiloxydiacetoxysilane, etc.; ketoximate silanes such as bis(dimethylketoximato)methylsilane, bis(cyclohexylketoximato)methylsilane, bis(diethylketoximato)trimethylsiloxysilane, bis(methylethylketoximato)methylsilane, tris(acetoximato)silane, etc.; and alkenyloxysilanes such as methylisopropenyloxysilane and so froth. Among these, alkoxysilanes are preferred and, among the alkoxy groups, methoxy is particularly preferred.

In the present invention, the hydrolyzable group X in the terminal silyl group obtained can be converted to another hydrolyzable group Y. Particularly when the X group is halogen, it gives a hydrogen halide giving off an intensely irritant odor during moisture-curing and, therefore, it is preferably converted to a different hydrolyzable group. The hydrolyzable functional group to which the halogen can be converted includes alkoxy, acyloxy, ketoximate, amido, acid amido, aminooxy and mercapto, among others. A variety of methods can be mentioned for the conversion of a halogen functional group to such a different hydrolyzable functional group. The method for conversion to an alkoxy group, for instance, includes reacting the halogen functional group with, for example, (1) an alcohol or phenol compound, such as methanol, ethanol, 2-methoxyethanol, sec-butanol, tert-butanol and phenol, (2) an alkoxide of sodium, potassium or lithium with an alcohol or phenol, (3) an orthoformic acid ester such as methyl orthoformate, ethyl orthoformate, etc., (4) an epoxy compound such as ethylene oxide, propylene oxide, allyl glycidyl ether, etc. Particularly, by the combination of (1) and (3), namely the reaction system using an alcohol or phenol compound and an orthoformic acid ester, or the combination of (1) and (4), namely the reaction system using an alcohol or phenol compound and an epoxy compound, the reaction can be carried out with facility and yield good results. By the same token, the method for conversion to an acyloxy group includes the method comprising reacting the halogen functional group with, for example, (1) a carboxylic acid such as acetic acid, propionic acid or the like, (2) an acid anhydride such as acetic anhydride, or (3) the sodium, potassium or lithium salt of a carboxylic acid. By the same token, the method for conversion to an aminooxy group includes the process which comprises reacting the halogen functional group with, for example, (1) a hydroxylamine such as N,N-dimethylhydroxylamine, N,N-diethylhydroxylamine, N,N-methylphenylhydroxylamine, N-hydroxypyrrolidine or the like; or (2) the sodium, potassium or lithium salt of a hydroxylamine. By the same token, the method for conversion to an amide group includes the process in which the halogen functional group is reacted with, for example, (1) a primary or secondary amine such as N,N-dimethylamine, N,N-diethylamine, N-methylphenylamine or pyrrolidine or (2) the sodium, potassium or lithium salt of a primary or secondary amine. The method for conversion to an acid amide group includes the process in which the halogen functional group is reacted with, for example, (1) an acid amide having at least one hydrogen atom on its nitrogen atom, such as acetamide, formamide or propionamide or (2) the sodium, potassium or lithium salt of such an acid amide. By using a ketoxime such as acetoxime, methyl ethyl ketoxime or the like or a reaction system using a mercaptan such as N-octyl mercaptan, t-butyl mercaptan or the like in combination with an orthoformic acid ester or an epoxy compound, the halogen groups can be partly converted to ketoximate groups or mercapto groups as the case may be, with the remainder being converted to the alkoxy groups derived from the orthoformic acid ester or epoxy compound. The conversion to a different hydrolyzable functional group is not limited to the above conversion of the halogen functional group but a variety of hydrolyzable functional groups can each be converted to a different hydrolyzable functional group for use.

As the Group VIII transition metal catalyst as the component (c) of the present invention, a metal complex catalyst of a metal selected from among Group VIII transition metals such platinum, rhodium, cobalt, palladium, nickel, etc. can be used with success. For example, $H_2PtCl_6 \cdot 6H_2O$, platinum-vinylsiloxane complexes, platinum-olefin complexes, Pt metal, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, etc. can be employed but in view of reactivity of hydrosilylation, the use of a platinum-vinylsiloxane complex or a platinum-olefin complex is particularly preferred. The platinum-vinylsiloxane complex mentioned above includes any and all compounds in which a siloxane, a polysiloxane or a cyclic siloxane having a vinyl group or groups as a ligand within the molecule and coordinating with a platinum atom. As an example of said ligand, there can be mentioned 1,1,3,3-tetramethyl-1,3-divinyldisiloxane, for example. The olefin ligands of said platinum-olefin complexes include 1,5-hexadiene, 1,7-octadiene, 1,9-decadiene, 1,11-dodecadiene, 1,5-cyclooctadiene and so forth. Among these ligands, 1,9-decadiene is particularly preferred. These ligands may be used in a combination of two or more species.

The platinum-vinylsiloxane complexes and platinum-olefin complexes are disclosed in Japanese Kokoku Publication Hei-8-9006. The hydrosilylation reaction is generally carried out at a temperature within the range of 10 to 150° C., preferably 20~120° C., more preferably 40~100° C. Where necessary, for the control of reaction temperature and adjustment of the viscosity of the reaction system, a solvent such as benzene, toluene, xylene, tetrahydrofuran, methylene chloride, pentane, hexane, heptane or the like can be employed.

By the production process of the present invention, a polyether oligomer having said reactive silicon group in its side chain and/or at its molecular terminus can be obtained.

The reactive silicon group may be present at the terminus of the polyether chain or may exist internally as a side chain but since the presence of said reactive silicon group at the molecular terminus results in an increased effective bulk of the polyether network in the cured end product, a rubbery cured product with high strength, high elongation and low elasticity tends to be obtained. On the other hand, when the reactive silicon group exists as a side chain, the effective bulk of the polyether network in the cured end product is smaller so that a rubbery cured product with high elasticity and low elongation tends to be obtained.

In the production process of the present invention, the intramolecular rearrangement of the unsaturated group during hydrosilylation is inhibited so that a polyether oligomer with the reactive silicon group introduced at a high rate can be obtained, and by curing this polyether oligomer there can be obtained a highly elastic cured product.

The preferred reactive silicon group-containing polyether oligomer of the present invention is such that the reactive silicon group is present exclusively at the terminus of the molecular chain and the introduction rate of the reactive silicon groups into the respective molecular termini is not less than 85% on the average.

Particularly preferred is a reactive silicon group-containing polyether oligomer, the terminus of which is represented by the following formula.

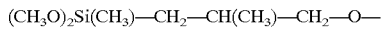

$(CH_3O)_2Si(CH_3)—CH_2—CH(CH_3)—CH_2—O—$

In the reactive silicon group-containing polyether oligomer of the invention, the number of the reactive silicon groups present at the respective molecular termini should be at least 0.1 on the average, and from the standpoint of curability, the number is preferably 0.5 to 5, more preferably 0.8 to 2. The particularly preferred number is 0.9 to 1 for insuring a cured product showing a satisfactory rubber-like elastic behavior. If the number of reactive silicon groups per polymer molecule is less than 1, the curability will become insufficient and a satisfactory rubber-like elastic behavior may not be expressed.

The use of several alternative methods may be contemplated for determining the silylation rate but at the current level of technology an NMR method appears to provide accurate data. Thus, the silyl introduction rate can be found by calculating the ratio of the number of termini into which the reactive silicon group has been introduced to the number of termini into which the group has not been introduced.

The reactive silicon group-containing polyether oligomer thus synthesized can be cured by atmospheric moisture at room temperature in the presence of a curing catalyst to give a film highly adherent to a metal, glass or other substrate, thus finding application as a structural, aircraft or automotive film-forming composition, a sealant composition, a paint composition or an adhesive composition. As the curing catalyst, the hitherto-known silanol condensation catalysts can be employed. Such catalysts can be used each alone or in a combination of two or more species.

The reactive silicon group-containing polyether oligomer of the present invention may be supplemented with various plasticizers, fillers, adhesivity-imparting agents such as an aminosilane compound, a dehydrating agent, etc., where necessary.

BEST MODES FOR CARRYING OUT THE INVENTION

The following examples illustrate the present invention in further detail and should by no means be construed as defining the scope of the invention.

EXAMPLE 1

A 50 ml three-neck, round-bottom distilling flask fitted with a reflux condenser was charged with 2 g of a methallyl group-terminated polypropylene oxide having a molecular weight of 2000 and 1 g of hexane and the system was dehydrated by azeotropic distillation at 90° C. After removal of the hexane by distillation under reduced pressure and nitrogen purging, 12 µl of platinum-vinyl catalyst (0.3 weight % in toluene, calculated in platinum equivalent) was added and under constant stirring with a magnetic stirrer, 0.34 g of DMS (dimethoxymethylsilane) was gradually added dropwise. This mixture was reacted at 90° C. for 12 hours, then the unreacted DMS was distilled off under reduced pressure. $^1$H-NMR analysis of the reaction product revealed that the ratio of the dimethoxymethylsilyl group introduced into the molecular terminus to the isopropenyl group formed by a side reaction (isomerization of alkenyl) was 99:1 and that the dimethoxymethylsilyl introduction rate was 90%.

EXAMPLE 2

A 100 ml three-neck, round-bottom distilling flask fitted with a reflux condenser was charged with 1 g of a 2-methyl-2-propenyl-terminated polypropylene oxide having a molecular weight of 2000 and 0.5 g of hexane and the system was dehydrated by azeotropic distillation at 90° C. After removal of the hexane by distillation under reduced pressure and nitrogen purging, 12 µl of platinum-1,9-decadiene complex catalyst (0.3 weight % in toluene, calculated in platinum equivalent) was added and under constant stirring with a magnetic stirrer, 0.17 g of DMS (dimethoxymethylsilane) was gradually added dropwise. The mixture was reacted at 90° C. for 4 hours, then the unreacted DMS was distilled off under reduced pressure. $^1$H-NMR analysis of the reaction product revealed that the ratio of the dimethoxymethylsilyl group introduced into the molecular terminus to the isopropenyl group formed by the side reaction was 98:2 and that the dimethoxymethylsilyl introduction rate was 95%.

EXAMPLE 3

Using dipropylene glycol as initiator and zinc hexacyanocobaltate-glyme complex as catalyst, propylene oxide was polymerized to give a polypropylene oxide having a molecular weight of 2000. A solution of NaOMe in methanol was added in an amount of 1.2 equivalents per equivalent of the hydroxyl group of hydroxy-terminated polyether oligomer thus obtained. After the methanol was distilled off, 3-chloro-2-methyl-1-propene was added for conversion of terminal hydroxyl groups to methallyl groups. Then, the terminal methallyl group was converted to a dimethoxymethylsilyl group by the procedure described in Example 1 to provide an oligomer. $^1$H-NMR analysis of the reaction product revealed that the ratio of the dimethoxymethylsilyl group introduced into the molecular terminus to the isopropenyl group formed by the side reaction was 99:1 and that the dimethoxymethylsilyl introduction rate was 97%.

EXAMPLE 4

Using polypropylene glycol as initiator and zinc hexacyanocobaltate-glyme complex as catalyst, propylene oxide was polymerized to give a hydroxy-terminated polyether oligomer having a hydroxyl value of 0.19 mmol/g, an iodine value of 0.25 g/100 g and a viscosity of 7 Pa·s. A solution of NaOMe in methanol was then added in an amount of 1.2 equivalents per equivalent of the hydroxyl group of hydroxy-terminated polyether oligomer. After the methanol was distilled off, 3-chloro-2-methyl-1-propene was added for conversion of terminal hydroxyl groups to methallyl groups. Then, 10 g of hexane was added to each 100 g of the resulting oligomer and azeotropic distillation was performed at 90° C. After removal of the hexane by distillation under reduced pressure and nitrogen purging, 200 ppm of platinum-vinyl catalyst (3 weight % in toluene, calculated in platinum equivalent) was added, and under constant stirring with a magnetic stirrer, 5 g of DMS was gradually added dropwise. This mixture was reacted at 90° C. for 15 hours, then the unreacted DMS was distilled off under reduced pressure. $^1$H-NMR analysis of the reaction product revealed that the ratio of the dimethoxymethylsilyl group introduced into the molecular terminus to the isopropenyl group formed by the side reaction was 98:2 and that the dimethoxymethylsilyl introduction rate was 97%. To 100 parts of the compound thus obtained was added 3 parts of dibutyltin dilaurate, followed by thorough mixing. After curing, 50% elongation modulus (M50) was measured. The M50 value was 0.5 MPa.

Comparative Example 1

A 100 ml three-neck, round-bottom distilling flask fitted with a reflux condenser was charged with 10 g of an allyl-terminated polypropylene oxide having a molecular weight of 2000 and 2 g of hexane and azeotropic dehydration was carried out at 90° C. After removal of the hexane by distillation under reduced pressure and nitrogen purging, 12 µl of hexachloroplatinic acid as catalyst (5% in isopropyl alcohol) was added, and under constant stirring with a magnetic stirrer, 1.25 g of DMS (dimethoxymethylsilane) was gradually added dropwise. This mixture was reacted at 90° C. for 2 hours, then the unreacted DMS was distilled off under reduced pressure. $^1$H-NMR analysis of the reaction product revealed that the ratio of the dimethoxymethylsilyl group introduced into the molecular terminus to the propenyl group formed by the side reaction was 82:18 and that the dimethoxymethylsilyl introduction rate was 82%.

Comparative Example 2

A 100 ml three-neck, round-bottom distilling flask fitted with a reflux condenser was charged with 10 g of an allyl-terminated polypropylene oxide having a molecular weight of 2000 and 2 g of hexane and the system was dehydrated by azeotropic distillation at 90° C. After removal of the hexane by distillation under reduced pressure and nitrogen purging, 12 µl of platinum-vinyl catalyst (3 weight % in xylene, calculated in platinum equivalent) was added, and under constant stirring with a magnetic stirrer, 1.32 g of DMS (dimethoxymethylsilane) was gradually added dropwise. This mixture was reacted at 90° C. for 2 hours, then the unreacted DMS was distilled off under reduced pressure. $^1$H-NMR analysis of the reaction product revealed that the ratio of the dimethoxymethylsilyl group introduced into the molecular terminus to the propenyl group formed by the side reaction was 83:17 and that the dimethoxymethylsilyl introduction rate was 83%.

Comparative Example 3

A 100 ml three-neck, round-bottom distilling flask fitted with a reflux condenser was charged with 10 g of an allyl-terminated polypropylene oxide having a molecular weight of 2000 and 2 g of hexane and the system was dehydrated by azeotropic distillation at 90° C. After removal of the hexane by distillation under reduced pressure and nitrogen purging, 36 µl of platinum-1,9-decadiene complex catalyst (0.3 weight % in toluene, calculated in platinum equivalent) was added, and under constant stirring with a magnetic stirrer, 1.17 g of DMS (dimethoxymethylsilane) was gradually added dropwise. This mixture was reacted at 90° C. for 2 hours, then the unreacted DMS was distilled off under reduced pressure. $^1$H-NMR analysis of the reaction product revealed that the ratio of the dimethoxymethylsilyl group introduced into the molecular terminus to the propenyl group formed by the side reaction was 83:17 and that the dimethoxymethylsilyl introduction rate was 83%.

Comparative Example 4

Using propylene glycol as initiator and zinc hexacyanocobaltate-glyme complex as catalyst, propylene oxide was polymerized to give a hydroxy-terminated polyether oligomer having an OH value of 0.19 mmol/g, an iodine value of 0.25 g/100 g and a viscosity of 7 Pa·s. A solution of NaOMe in methanol was then added in an amount of 1.2 equivalents per equivalent of the hydroxyl group of hydroxy-terminated polyether oligomer. After the methanol was distilled off, allyl chloride was added for conversion of terminal hydroxyl groups to allyl groups. To 100 g of the resulting oligomer was added 10 g of hexane, and azeotropic distillation was carried out at 90° C. After removal of the hexane by distillation under reduced pressure and nitrogen purging, 200 ppm of hexachloroplatinic acid as catalyst (5% in isopropyl alcohol) was added, and under constant stirring with a magnetic stirrer, 5 g of DMS (dimethoxymethylsilane) was gradually added dropwise. This mixture was reacted at 90° C. for 15 hours, then the unreacted DMS was distilled off under reduced pressure. $^1$H-NMR analysis of the reaction product revealed that the ratio of the dimethoxymethylsilyl group introduced into the molecular terminus to the propenyl group formed by the side reaction was 82:18 and that the dimethoxymethylsilyl introduction rate was 82%. To 100 parts of the compound thus obtained was added 3 parts of dibutyltin dilaurate, followed by thorough mixing. After curing, 50% elongation modulus (M50) was determined. The M50 value was 0.25 MPa.

INDUSTRIAL APPLICABILITY

The intramolecular rearrangement reaction of an unsaturated group during hydrosilylation was inhibited so that a polyether oligomer with a reactive silicon group introduced at a high rate could be provided. By curing this polyether oligomer, a highly elastic cured product could be obtained.

What is claimed is:

1. A process for producing a reactive silicon group-containing polyether polymer, which comprises reacting (a) a polyether polymer the backbone chain of which comprises a polyether and which contains in a side chain or at a terminus of its molecule at least one unsaturated group of the general formula (1):

$$H_2C=C(R^1)-R^2-O-  \quad (1)$$

wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms, or the general formula (2):

$$HC(R^1)=CH-R^2-O- \quad (2)$$

wherein $R^1$ represents a hydrocarbon group of not more than 10 carbon atoms; $R^2$ represents a divalent organic group of 1 to 20 carbon atoms which contains at least one atomic species selected from the group consisting of hydrogen, oxygen and nitrogen as its constituent atom or atoms with, (b) a reactive silicon group-containing compound of the general formula $$H-Si(R^4{}_{3-a})X_a$$

wherein $R^4$ represents an alkyl group of 1 to 20 carbon atoms, an aryl group of 6 to 20 carbon atoms, an aralkyl group of 7 to 20 carbon atoms, or a triorganosiloxy group of the formula $(R')_3SiO-$; when two or more $R^4$ groups are present, they are the same or different; $R'$ represents a monovalent hydrocarbon group of 1 to 20 carbon atoms and the three $R'$ groups are the same or different; X represents a hydroxyl group or a hydrolyzable group and when two or more X groups are present, they are the same or different; a represents 1, 2 or 3, (c) in the presence of a Group VIII transition metal catalyst selected from the group consisting of platinum-vinylsiloxane complexes to thereby introduce the reactive silicon group into said polymer (a).

2. The process for producing a reactive silicon group-containing polyether polymer according to claim 1, wherein the group-containing polyether polymer (a) which contains at least one unsaturated group is derived from a polyether polymer obtainable by ring-opening addition polymerization of an alkylene oxide in the presence of a double metal cyanide complex catalyst.

3. The process for producing a reactive silicon group-containing polyether polymer according to claim 1, wherein the group-containing polyether polymer (a) which contains at least one unsaturated group is a derivative of a ring-opening addition polymer of an alkylene oxide.

4. The process for producing a reactive silicon group-containing polyether polymer according to claim 1, wherein the backbone chain of the group-containing polyether polymer (a) which contains at least one unsaturated group comprises predominantly polypropylene oxide.

5. The process for producing a reactive silicon group-containing polyether polymer according to claim 1, wherein in the general formulae (1) and (2), $R^1$ is $CH_3-$ or $CH_3CH_2-$.

6. The process for producing a reactive silicon group-containing polyether polymer according to claim 1, wherein the unsaturated group of the general formula (1) is a group represented by the formula (4):

$$H_2C=C(CH_3)-CH_2-O- \quad (4).$$

7. A reactive silicon group-containing polyether polymer obtainable by the process according to claim 1.

8. The reactive silicon group-containing polyether polymer according to claim 7, wherein the reactive silicon group is present exclusively at the terminus of the molecular chain and that the introduction rate of the reactive silicon group into the molecular chain termini is not less than 85% on the average.

9. A reactive silicon group-containing polyether polymer having a terminal structure represented by the following formula $$(CH_3O)_2Si(CH_3)-CH_2-CH(CH_3)-CH_2-O-.$$

10. The process for producing a reactive silicon group-containing polyether polymer according to claim 2, wherein the backbone chain of the group-containing polyether polymer (a) which contains at least one unsaturated group comprises predominantly polypropylene oxide.

11. A process for producing a reactive silicon group-containing polyether polymer, which comprises reacting (a) a polyether polymer the backbone chain of which comprises a polyether and which contains in a side chain or at a terminus of its molecular at least one unsaturated group of the formula (5):

$$HC(CH_3)=CH-CH_2-O- \quad (5)$$

with (b) a reactive silicon group-containing compound of the general formula $$H-Si(R^4_{3-a})X_a$$

wherein $R^4$ represents an alkyl group of 1 to 20 carbon atoms, an aryl group of 6 to 20 carbon atoms, an aralkyl group of 7 to 20 carbon atoms, or trioganosiloxy group of the formula $(R')_3SiO-$; when two or more $R^4$ groups are present, they are the same or different; R' represents a monovalent hydrocarbon group of 1 to 20 carbon atoms and the three R' groups are the same or different; X represents a hydroxyl group or a hydrolysable group and when two or more X groups are present, they are the same or different; a represents 1, 2 or 3, (c) in the presence of a Group VIII transition metal catalyst selected from the group consisting of platinum-vinylsiloxane complexes and platinum-olefin complexes to thereby introduce the relative silicon group into said polymer (a).

* * * * *